United States Patent
Brochu et al.

(10) Patent No.: US 7,870,209 B2
(45) Date of Patent: Jan. 11, 2011

(54) METHOD AND APPARATUS FOR USER MODERATION OF ONLINE CHAT ROOMS

(75) Inventors: Jason M. Brochu, Monroe, NY (US); Peter F. Cipriano, Staatsburg, NY (US); Raymond B. Jennings, III, Ossining, NY (US); Jason D. LaVoie, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 12/163,516

(22) Filed: Jun. 27, 2008

(65) Prior Publication Data

US 2008/0263204 A1 Oct. 23, 2008

Related U.S. Application Data

(63) Continuation of application No. 11/333,029, filed on Jan. 17, 2006, now abandoned.

(51) Int. Cl.
*G06F 15/16* (2006.01)
(52) U.S. Cl. ............... 709/206; 709/204; 705/1; 707/100; 379/88.17
(58) Field of Classification Search ............... 709/221, 709/203, 204; 705/1; 707/100; 379/88.17
See application file for complete search history.

(56) References Cited

U.S. PATENT DOCUMENTS 6,449,344 B1 * 9/2002 Goldfinger et al. ....... 379/88.17
6,823,363 B1 * 11/2004 Noveck et al. ............. 709/204
2005/0131918 A1 * 6/2005 Hillis et al. ................. 707/100
2007/0078675 A1 * 4/2007 Kaplan ......................... 705/1

FOREIGN PATENT DOCUMENTS

JP 2002041759 A 2/2005

OTHER PUBLICATIONS

Oikarine, RFC 1459-Internet Relay Chat Protocol, May 1993.*
Oikarinen, RFC 1459—Internet Relay Chat Protocol, May 1993.
Lampe et al., "Slash(dot) and burn: distributed moderation in a large online conversation space" Proceedings of the SIGCHI Conference on Human Factors in Computing Systems. ACM, 2004, 543-550.
Lampe et al., "Follow the (Slash)dot: Effect of Feedback on New Members in an Online Community" ACM, 2005.
Slashdot.org "Slashdot FAQ—Comments and Moderation" Slashdot.org/FAQ/comm.-mod.shtml, Jan. 2005.

* cited by examiner

*Primary Examiner*—Tammy T Nguyen

(57) ABSTRACT

One embodiment of the present method and apparatus for user-moderation of an online chat room in which a plurality of users are exchanging messages includes providing the chat room and controlling a manner in which the users send and receive the messages in the chat room in accordance with user feedback relating to the messages. In one embodiment, the user feedback is received in the form of user chat profiles, which describe the respective users' participation in the chat room, and flags, which users may be given in response to messages that are deemed inappropriate for the chat room.

19 Claims, 4 Drawing Sheets

METHOD AND APPARATUS FOR USER MODERATION OF ONLINE CHAT ROOMS

CROSS REFERENCE TO RELATED APPLICATIONS

This application is a continuation of co-pending U.S. patent application Ser. No. 11/333,029, filed Jan. 17, 2006 now abandoned, entitled "METHOD AND APPARATUS FOR USER MODERATION OF ONLINE CHAT ROOMS", which is herein incorporated by reference in its entirety.

FIELD OF THE INVENTION

The present invention relates generally to client/server communications and relates more particularly to the moderation of online chat rooms.

BACKGROUND

FIG. 1 is a schematic diagram illustrating a typical chat environment 100 wherein two or more chat participants or users $102_1$-$102_n$ (hereinafter collectively referred to as "users 102") communicate via a chat session administered by a centralized server 104.

In order to chat, users 102 post messages $106_1$-$106_n$ (hereinafter collectively referred to as "messages 106") to the chat room via the server 104. That is, users 102 send messages to the server 104, which in turn delivers the messages to all chat room participants/users 102. In this manner, users 102 can communicate electronically in substantially real time.

One common problem that thwarts the utility of online chat rooms is the posting of spam (e.g., unsolicited or unwanted messages, advertisements, files, etc.) and/or inappropriate messages (e.g., abusive or off-topic messages or messages using offensive language). Methods are known for combating spam in online chat rooms, including methods that identify and block unsolicited messages and methods that monitor online chat rooms for specific known problems. However, such methods are typically based on static system parameters that do not even participate in, and thus have no knowledge of the current content of, particular chat sessions.

Thus, there is a need in the art for a method and apparatus for user moderation of online chat rooms.

SUMMARY OF THE INVENTION

One embodiment of the present method and apparatus for user-moderation of an online chat room in which a plurality of users are exchanging messages includes providing the chat room and controlling a manner in which the users send and receive the messages in the chat room in accordance with user feedback relating to the messages. In one embodiment, the user feedback is received in the form of user chat profiles, which describe the respective users' participation in the chat room, and flags, which users may be given in response to messages that are deemed inappropriate for the chat room.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for user moderation of online chat rooms. Embodiments of the present invention make it possible to efficiently moderate online chat rooms by enabling users of the chat rooms to dynamically control the content posted therein, e.g., in response to changing chat room conditions and/or content preferences. This affords greater customization of the chat experience to user needs, as well as more effective and more rapid addressing of chat room problems, than existing methods.

In one embodiment, the invention implements the concept of flags and chat profiles in order to allow chat room users to self-moderate online chat rooms in which they participate. Flags are messages sent by users in response to other users' messages that are deemed as inappropriate for the chat room. The sending or receipt of a flag, as discussed in greater detail below, will affect a user's ability to participate in a chat room. A user may both send and receive multiple flags.

Figure 1:
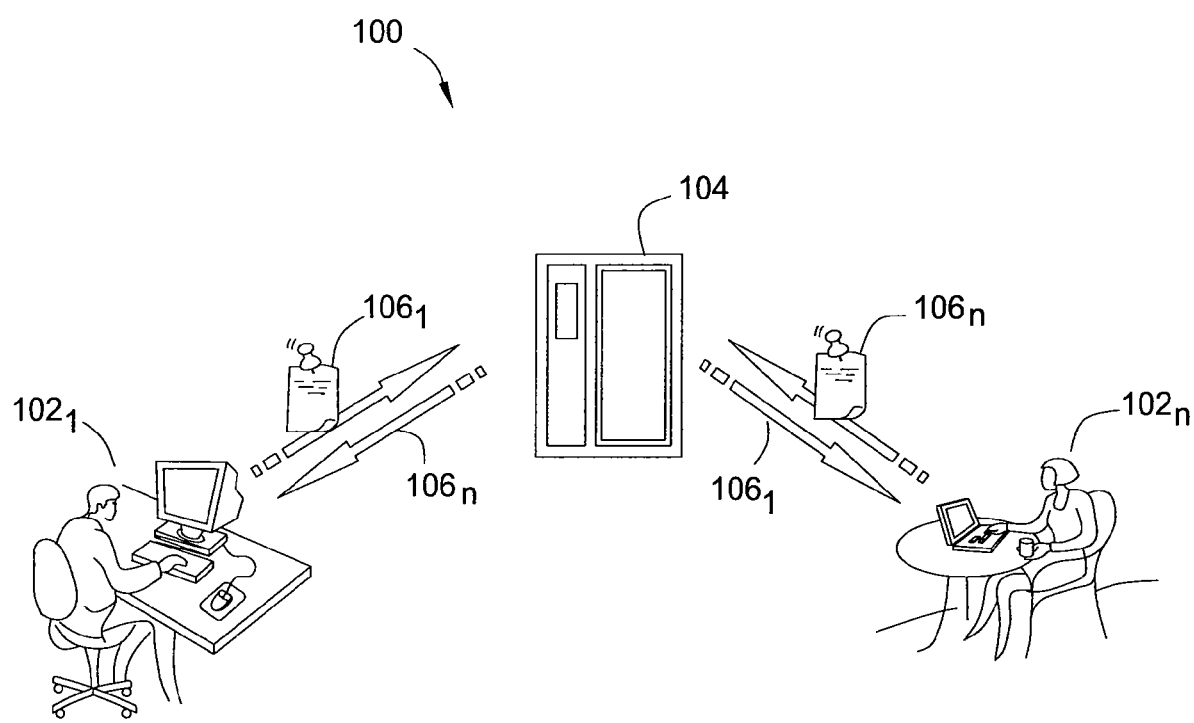
FIG. 1 is a schematic diagram illustrating a typical chat environment wherein two or more chat participants or users communicate via a chat session administered by a centralized server.
Figure 2:
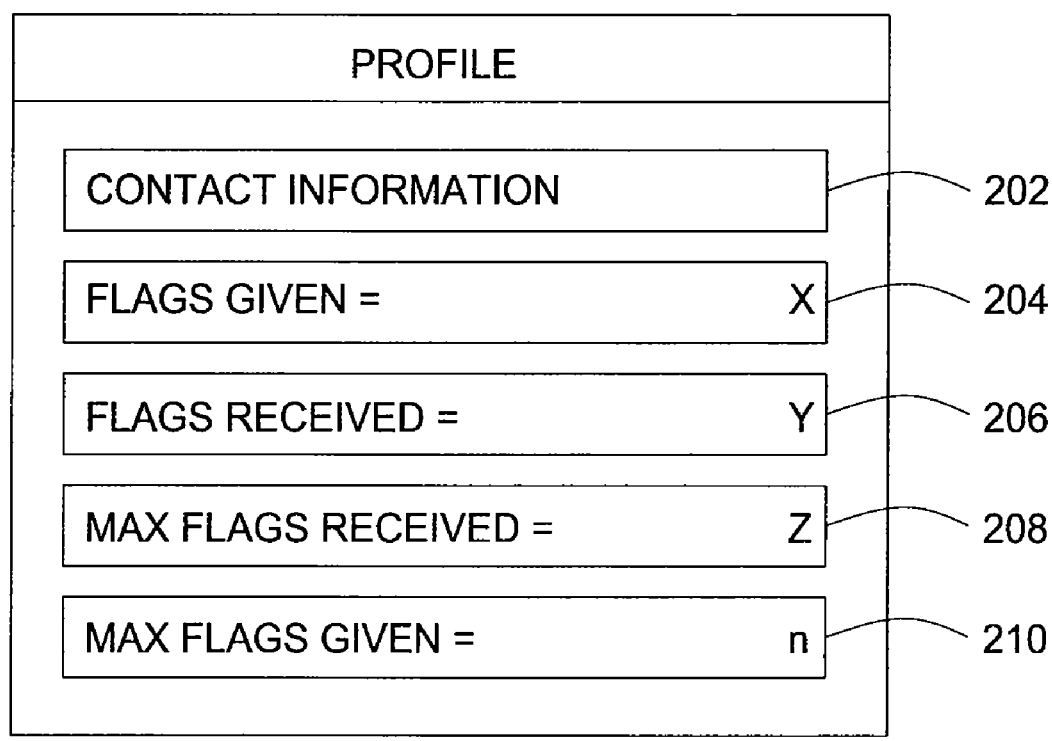
FIG. 2 is a schematic diagram illustrating one embodiment of a user chat profile, according to the present invention.

FIG. 2 is a schematic diagram illustrating one embodiment of a user chat profile 200, according to the present invention. Chat profiles such as the chat profile 200 provide a snapshot of a user's participation in the chat room. In one embodiment, the chat profile 200 defines user contact information 202 (or other means of identifying the associated user), as well as a plurality of parameters relating to the user's participation in the chat room, including at least: a "flags given" setting 204, a "flags received" setting 206, a "max flags received" setting 208 and a "max flags given" setting 210.

The "flags given" setting 204 keeps track of flags the associated user has given in response to messages from other users. In one embodiment, the "flags given" setting 204 represents this as the absolute number of flags the user has given (e.g., n flags). In another embodiment, the "flags given" setting 204 provides a score or rating that reflects the number of flags the user has given (e.g., where every flag given is represented by n points). The "flags received" setting 206 keeps track of flags the associated user has received in response to his or her own messages. Like the "flags given" setting 204, the "flags received" setting 206 may represent this as an absolute number of flags, or as a score that reflects a number of flags.

The "max flags received" setting 208 controls who may send messages to the user associated with the chat profile 200. In one embodiment, the "max flags received" setting 208 establishes that the user associated with the chat profile 200 will not accept messages from other users who have received more than a threshold number of flags. This threshold may define an absolute number of flags (e.g., n flags), or it may define a user score or rating that is affected by a number of flags received (e.g., where every n flags affects a user score by x points). Thus, for example, if a first user's chat profile 200 sets the "max flags received" setting 208 at 20 flags, then a second user wishing to send a message to the first user must have received no more than 20 flags.

The "max flags given" setting 210 also controls who may receive messages from the user associated with the chat profile 200. In one embodiment, the "max flags given" setting 210 establishes that the user associated with the chat profile 200 will not send messages to other users who have given more than a threshold number of flags. This threshold may define an absolute number of flags (e.g., n flags), or it may define a user score or rating that is affected by a number of flags given (e.g., where every n flags affects a user score by x points). Thus, for example, if a first user's chat profile 200 sets the "max flags given" setting 210 at 20, then a second user must have given no more than 20 flags in order to receive a message from the first user. Both the "max flags received" setting 208 and the "max flags given" setting 210 may be adjusted by the user associated with the chat profile 200 at any time before, during or after a given chat session.

Figure 3:
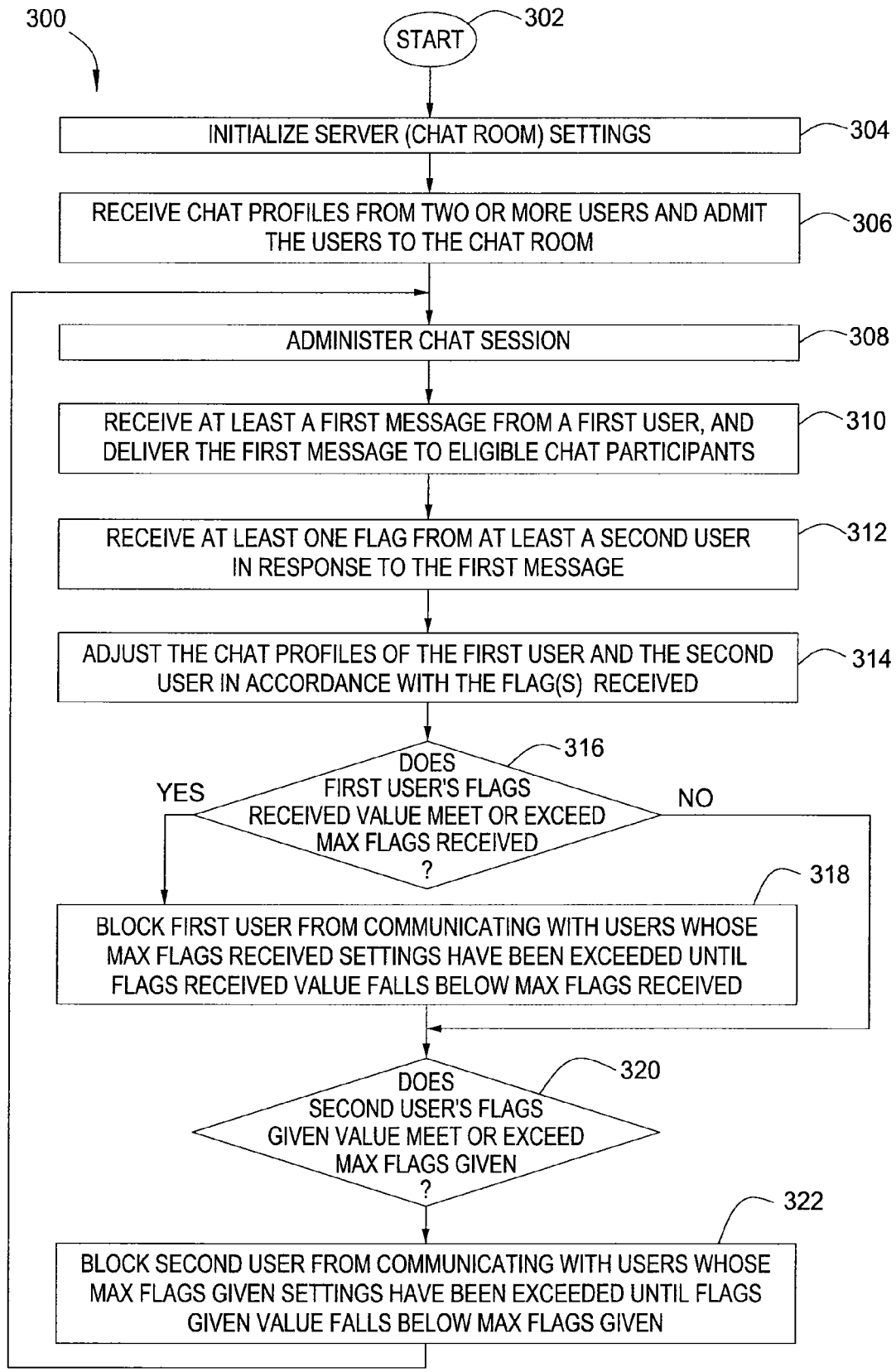
FIG. 3 is a schematic diagram illustrating one embodiment of method for user-moderation of an online chat room, according to the present invention.

FIG. 3 is a schematic diagram illustrating one embodiment of method 300 for user-moderation of an online chat room, according to the present invention. The method 300 may be implemented at, for example, a centralized server that administers a chat session. The method 300 relies on user feedback in the form of flags and chat profiles, as discussed above, in order to allow chat room users to self-moderate the chat room.

The method 300 is initialized at step 302 and proceeds to step 304, where the method 300 initializes settings for the server on which the chat room will be administered. The server settings define the manner in which flags will affect users' chat profiles and abilities to participate in an associated chat room (e.g., hosted by the server). In one embodiment, server settings include at least: a "flags received" property, a "flags given" property, a "time" property and a "desert" property. The "flags received" property defines how to adjust a user's chat profile in response to one or more flags provoked by the user's message(s) (e.g., how the received flags will affect the user's "flags received" setting). In one embodiment, the "flags received" property may limit the amount of flags that can be applied to a single message, such that a single message does not cause a user's "flags received" setting to skyrocket when multiple users respond to the message.

The "flags given" property defines how to adjust a user's chat profile in response to one or more flags given by the user to other users (e.g., how the given flags will affect the user's "flags given" setting). The "time" property defines a period of time for which flags received or given by a user will affect the user's chat profile (e.g., how long the flags will count toward the user's "flags received" or "flags given" setting). The "desert" property defines how to adjust a first user's chat profile when a second user, who previously gave the user a flag, leaves the chat (e.g., when flags received from the departing user may be removed from the user's "flags received" setting). In one embodiment, the "desert" property supersedes the "time" property such that the first user's chat profile is adjusted upon the second user leaving the chat session, even though the "time" property may not have expired for the flags given by the second user. Thus, a user whose participation has been limited by sending or receiving flags may at some point regain his or her standing (e.g., a less limiting flags received and/or flags given value) and not be permanently labeled as a negative chat contributor.

In addition, in some embodiments, the server settings also include one or more filters for examining incoming messages (e.g., in accordance with one or more predefined criteria) before they are delivered to users of the chat room. For example, a filter might search for offensive language or off-topic content and discard (e.g., not deliver) posts that contain a threshold amount of such inappropriate content. In such an embodiment, the server has the ability to directly issue flags to offenders (e.g., without specific prompting from another chat room user sending a flag).

Once the chat room and server settings have been initialized, the method 300 proceeds to step 306 and receives chat profiles from one or more users (chat participants) wishing to join the chat session and admits these users to the chat room. In one embodiment, the chat profiles are substantially similar to the chat profiles discussed above in terms of the parameters defined therein.

In step 308, the method 300 administers the chat session. That is, the method 300 facilitates the exchange of messages between users.

In step 310, the method 300 receives at least a first message from a first user and delivers the first message to other eligible users in accordance with typical protocols for administering a chat session (e.g., where user eligibility is determined in accordance with the chat profiles—in particular the "max flags given" and "max flags received" settings—of the first user and the other users participating in the chat session, as discussed above).

In step 312, the method 300 receives at least one flag from at least a second user in response to the first message. For example, the second user (as well as one or more other users) might find the language used in the first message offensive, or might believe that the first message is spam, and accordingly might flag the first user.

Once at least one flag has been received, the method 300 proceeds to step 314 and adjusts the chat profiles of both the first user and the second user, in accordance with the flag(s) received. That is, the method 300 adjusts the "flags received" parameter of the first user's chat profile to reflect the newly received flags. Additionally, the method 300 adjusts the "flags given" parameter of the second user's chat profile to reflect the newly given flags. The method 300 adjusts the "flags given" for every user from which a flag was received.

In step 316, the method 300 determines whether, in light of the newly received flag(s), the first user's "flags received" value meets or exceeds the "max flags received" settings of any other users of the chat room.

If the method 300 determines that the first user's "flags received" value does meet or exceed or exceed the "max flags received" settings of any other users of the chat room, the method 300 proceeds to step 318 and at least temporarily blocks the first user from communicating at least with those users whose "max flags received" settings have been exceeded by the first user. In one embodiment, the first user is only blocked for a limited period of time, e.g., in accordance with the "time" property of the server settings. Thus, the first user may eventually be enabled to communicate with the users from whom he or she is blocked once the "flags received" value falls below the "max flags received" settings for those users (e.g., once a sufficient number of flags expire). In another embodiment, a "max flags received" threshold may be set for the chat room in general, such that if the first user's "flags received" value meets or exceeds that chat room's "max flags received" setting, the first user is prevented from communicating with anyone in the chat room, regardless of the other users' respective "max flags received" settings.

In step 320, the method determines whether, in light of the newly given flag(s), the second user's "flags given" value meets or exceeds the "max flags given" settings of any other users of the chat room. Note that if the method 300 determines in step 316 that the first user's "flags received" value does not meet or exceed the "max flags received" settings of any other users of the chat room, the method 300 proceeds directly to step 320 from step 316. In another embodiment, a "max flags given" threshold may be set for the chat room in general, such that if the second user's "flags given" value meets or exceeds that chat room's "max flags given" setting, the second user is prevented from communicating with anyone in the chat room, regardless of the other users' respective "max flags given" settings.

If the method 300 determines, in accordance with step 320, that the second user's "flags given" value does not meet or exceed or exceed the "max flags given" settings of any other users of the chat room, the method 300 returns to step 308 and continues to administer the chat session.

Alternatively, if the method 300 determines, in accordance with step 320, that the second user's "flags given" value does meet or exceed the "max flags given" settings of any other users of the chat room, the method 300 proceeds to step 322 and at least temporarily blocks the second user from communicating at least with those users whose "max flags given" settings have been exceeded by the second user. In one embodiment, the second user is only blocked for a limited period of time, e.g., in accordance with the "time" property of the server settings. Thus, the second user may eventually be enabled to communicate with the users from whom he or she is blocked once the "flags given" value falls below the "max flags given" settings for those users (e.g., once a sufficient number of flags expire). The method 300 then returns to step 308 and continues to administer the chat session.

The method 300 thereby enables chat room users to control their chat experience dynamically and on-demand by flagging messages that are deemed to be inappropriate and adjusting chat profile settings to determine which other users they will exchange messages with. Thus, users can self-moderate a chat room according to changing chat room conditions and/or content preferences. This affords greater customization of the chat experience to user needs, as well as more effective and more rapid addressing of chat room problems, than existing methods.

Moreover, the use of the chat profiles will enable new chat room users to be better informed, upon entering a chat room, of the chat room conditions. For example, if the existing users in the chat room have high values for their "flags given" settings, the new user will realize that he or she needs to stay on topic and/or avoid posting inappropriate messages in order to participate in the chat session. In further embodiments, users may only be allowed to flag a single message once, so that a single user can not, by continuously flagging another user's message, have that other user blocked from the chat room (e.g., multiple users will need to flag a message).

In one embodiment, a user's chat profile is not chat room-specific. That is, the settings of a user's chat profile will not change substantially as the user moves to different chat rooms (e.g., the "max flags given", "max flags received", "flags given" and "flags received" settings will not be substantially affected) and, in some embodiment, may even be tied into existing ratings systems for other applications such as online auction or electronic commerce applications.

Figure 4:
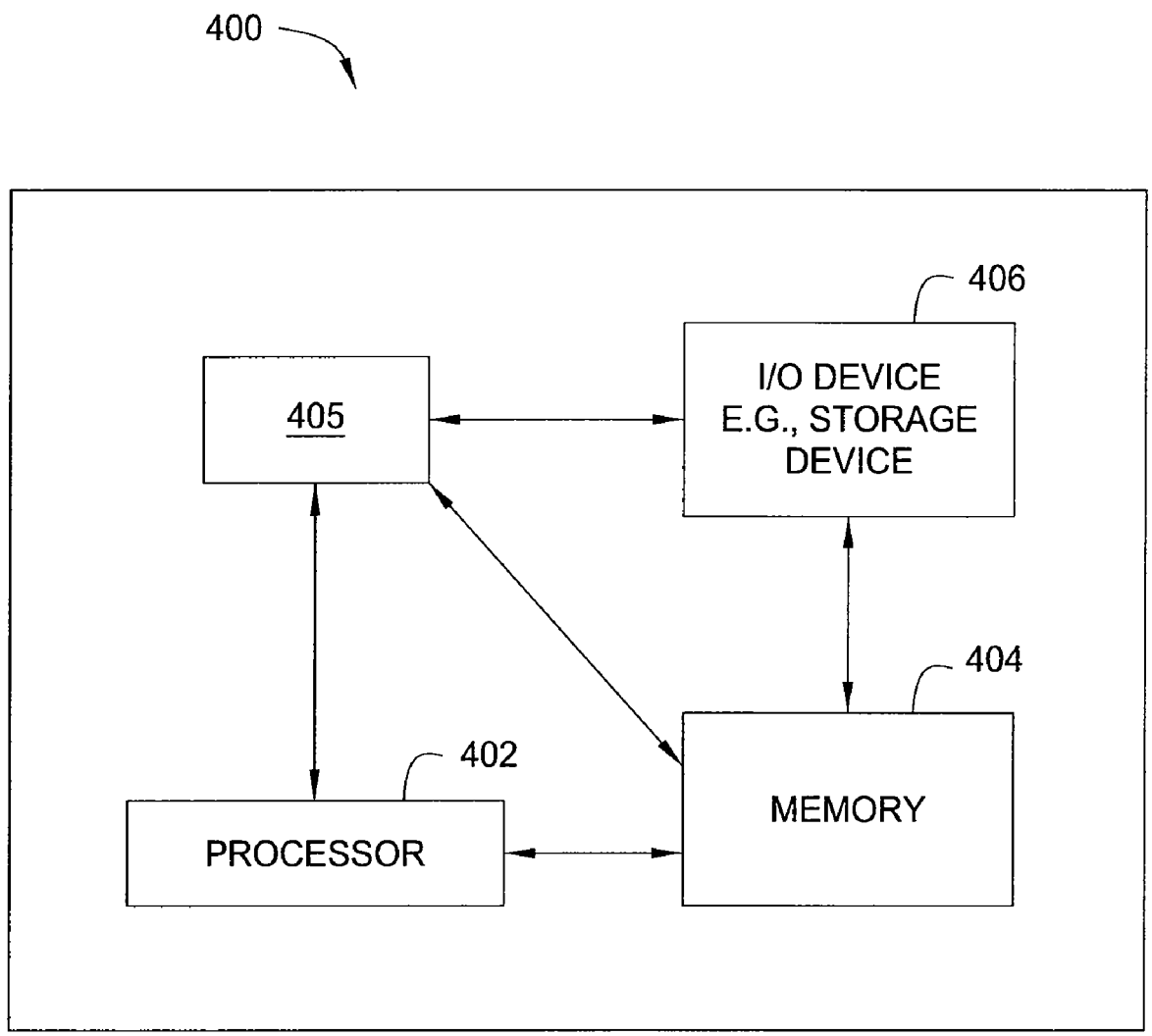
FIG. 4 is a high level block diagram of the chat room moderation method that is implemented using a general purpose computing device.

FIG. 4 is a high level block diagram of the chat room moderation method that is implemented using a general purpose computing device 400. In one embodiment, a general purpose computing device 400 comprises a processor 402, a memory 404, a moderation module 405 and various input/output (I/O) devices 406 such as a display, a keyboard, a mouse, a modem, and the like. In one embodiment, at least one I/O device is a storage device (e.g., a disk drive, an optical disk drive, a floppy disk drive). It should be understood that the moderation module 405 can be implemented as a physical device or subsystem that is coupled to a processor through a communication channel.

Alternatively, the moderation module 405 can be represented by one or more software applications (or even a combination of software and hardware, e.g., using Application Specific Integrated Circuits (ASIC)), where the software is loaded from a storage medium (e.g., I/O devices 406) and operated by the processor 402 in the memory 404 of the general purpose computing device 400. Thus, in one embodiment, the moderation module 405 for enabling user-moderation of online chat rooms described herein with reference to the preceding Figures can be stored on a non-transitory computer readable storage medium (e.g., RAM, magnetic or optical drive or diskette, and the like).

Thus, the present invention represents a significant advancement in the field of client/server communications. A method and apparatus are provided that make it possible to efficiently moderate online chat rooms by enabling users of the chat rooms to control the content posted therein. By flagging messages that are deemed to be inappropriate and adjusting chat profile settings to determine which other users they will exchange messages with, users can dynamically control the chat experience as necessary. Thus, users can self-moderate chat rooms according to changing chat room conditions and/or content preferences. This affords greater customization of the chat experience to user needs, as well as more effective and more rapid addressing of chat room problems, than existing methods.

While foregoing is directed to the preferred embodiment of the present invention, other and further embodiments of the invention may be devised without departing from the basic scope thereof, and the scope thereof is determined by the claims that follow.

The invention claimed is:

1. A method for moderating an online chat room in which a plurality of users exchange messages, the method comprising:

providing said chat room; and controlling an ability of said plurality of users to send and receive said messages in said chat room in accordance with user feedback relating to said messages, wherein said user feedback includes at least one user chat profile for each sender and each receiver of said messages, said at least one user chat profile describing a participation of an associated user in said chat room and defining a plurality of parameters relating to said participation, said plurality of parameters comprising a max flags given setting that is adjustable by said associated user to control those of said plurality of users who will receive those of said messages that are sent by said associated user, wherein said max flags given setting establishes that said associated user will not send messages to others of said plurality of users who have given more than a threshold number of flags.

2. The method of claim 1, wherein said user feedback further includes at least one flag.

3. The method of claim 2, wherein said at least one flag is a message sent by a first user in response to at least one message from said plurality of messages sent by a second user, where said flag is representative of said first user deeming said message sent by said second user inappropriate for said chat room.

4. The method of claim 3, wherein a number of flags that may be given to said second user is limited.

5. The method of claim 3, wherein a period of time for which said flag is valid is limited.

6. The method of claim 2, wherein said at least one flag is issued directly by a server in response to at least one of said messages.

7. The method of claim 1, wherein said plurality of parameters further comprises at least one of: a flags given setting, a flags received setting, or a max flags received setting.

8. The method of claim 7, wherein said flags given setting represents a number of flags given by said associated user in response to one or more messages posted to said chat room by others of said plurality of users.

9. The method of claim 7, wherein said flags received setting represents a number of flags received by said associated user in response to one or more messages posted to said chat room by said associated user.

10. The method of claim 7, wherein said max flags received setting establishes that said associated user will not accept messages from others of said plurality of users who have received more than a threshold number of flags.

11. The method of claim 1, wherein said at least one user chat profile is not substantially altered as an associated user moves among multiple chat rooms.

12. The method of claim 11, wherein said at least one user chat profile further ties into multiple computing applications.

13. The method of claim 12, wherein said multiple computing applications include at least one of: chat applications, online auction applications or electronic commerce applications.

14. The method of claim 1, wherein said controlling further comprises:
 filtering said messages in accordance with one or more predefined criteria.

15. The method of claim 1, wherein said max flags given setting is directly adjustable by said associated user.

16. A non-transitory computer readable storage medium containing an executable program for administering an online chat room in which a plurality of users exchange messages, where the program performs the steps of:
 providing said chat room; and
 controlling an ability of said plurality of users to send and receive said messages in said chat room in accordance with user feedback relating to said messages, wherein said user feedback includes at least one user chat profile for each sender and each receiver of said messages, said at least one user chat profile describing a participation of an associated user in said chat room and defining a plurality of parameters relating to said participation, said plurality of parameters comprising a max flags given setting that is adjustable by said associated user to control those of said plurality of users who will receive those of said messages that are sent by said associated user, wherein said max flags given setting establishes that said associated user will not send messages to others of said plurality of users who have given more than a threshold number of flags.

17. The computer readable storage medium of claim 16, wherein said user feedback further includes at least one flag.

18. The computer readable storage medium of claim 16, wherein said plurality of parameters further comprises at least one of: a flags given setting, a flags received setting, or a max flags received setting.

19. Apparatus for administering an online chat room in which a plurality of users exchange messages, said apparatus comprising:
 means for providing said chat room; and
 means for controlling an ability of said plurality of users to send and receive said messages in said chat room in accordance with user feedback relating to said messages, wherein said user feedback includes at least one user chat profile for each sender and each receiver of said messages, said at least one user chat profile describing a participation of an associated user in said chat room and defining a plurality of parameters relating to said participation, said plurality of parameters comprising a max flags given setting that is adjustable by said associated user to control those of said plurality of users who will receive those of said messages that are sent by said associated user, wherein said max flags given setting establishes that said associated user will not send messages to others of said plurality of users who have given more than a threshold number of flags.

* * * * *